United States Patent
Khan

(10) Patent No.: US 9,918,226 B2
(45) Date of Patent: Mar. 13, 2018

(54) SPOOFING PROTECTION FOR SECURE-ELEMENT IDENTIFIERS

(71) Applicant: Apple Inc., Cupertino, CA (US)

(72) Inventor: Ahmer A. Khan, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 553 days.

(21) Appl. No.: 14/474,737

(22) Filed: Sep. 2, 2014

(65) Prior Publication Data

US 2016/0286391 A1 Sep. 29, 2016

Related U.S. Application Data

(60) Provisional application No. 61/921,697, filed on Dec. 30, 2013.

(51) Int. Cl.
| | |
|---|---|
| H04L 9/32 | (2006.01) |
| H04W 12/06 | (2009.01) |
| G06Q 20/38 | (2012.01) |
| G06Q 20/32 | (2012.01) |

(52) U.S. Cl.
CPC .......... *H04W 12/06* (2013.01); *G06Q 20/322* (2013.01); *G06Q 20/327* (2013.01); *G06Q 20/3226* (2013.01); *G06Q 20/3227* (2013.01); *G06Q 20/382* (2013.01); *G06Q 20/3821* (2013.01); *G06Q 20/3825* (2013.01); *G06Q 20/3827* (2013.01); *G06Q 20/3829* (2013.01); *G06Q 20/38215* (2013.01); *H04L 9/3247* (2013.01); *H04L 9/3268* (2013.01); *H04L 9/3271* (2013.01)

(58) Field of Classification Search
USPC ............................... 713/176, 188; 726/22, 23
See application file for complete search history.

(56) References Cited

U.S. PATENT DOCUMENTS

| | | | | |
|---|---|---|---|---|
| 6,826,690 | B1 * | 11/2004 | Hind | G06F 21/31 713/173 |
| 7,308,431 | B2 * | 12/2007 | Asokan | G06Q 20/02 705/64 |
| 7,308,574 | B2 * | 12/2007 | Dare | H04L 9/3265 713/155 |
| 7,340,057 | B2 * | 3/2008 | Martin, Jr. | H04L 63/04 380/247 |
| 7,536,722 | B1 * | 5/2009 | Saltz | G06F 21/33 726/20 |

(Continued)

*Primary Examiner* — Amare F Tabor
(74) *Attorney, Agent, or Firm* — Sterne, Kessler, Goldstein & Fox P.L.L.C.

(57) ABSTRACT

The disclosed embodiments related to a first electronic device (such as a cellular telephone) that includes a secure element. In response to a challenge and a request for a secure-element identifier associated with the secure element, which are received from a second electronic device (such as a trusted services manager that loads content onto the secure element), the secure element provides to the second electronic device: the secure-element identifier, a certificate associated with a provider of the secure element, and a digital signature. The digital signature may include a signed version of the challenge and the secure-element identifier, which are encrypted using an encryption key associated with a provider of the secure element. In this way, the second electronic device may certify the secure element.

20 Claims, 8 Drawing Sheets

(56) References Cited

U.S. PATENT DOCUMENTS

| | | | | |
|---|---|---|---|---|
| 8,584,215 B2* | 11/2013 | Narasimha | ............ | H04L 9/3247 |
| | | | | 726/6 |
| 8,645,699 B2* | 2/2014 | Wood | .................... | H04L 9/3263 |
| | | | | 380/30 |
| 8,700,901 B2* | 4/2014 | Lund | .................. | H04L 63/0823 |
| | | | | 705/67 |
| 9,313,214 B2* | 4/2016 | Xiao | ....................... | G06F 21/51 |
| 2008/0092211 A1* | 4/2008 | Klemets | ............. | H04L 63/0823 |
| | | | | 726/3 |
| 2008/0250246 A1* | 10/2008 | Arditti | ................. | H04L 9/3263 |
| | | | | 713/173 |
| 2008/0298579 A1* | 12/2008 | Abu-Amara | ......... | H04L 63/061 |
| | | | | 380/30 |
| 2010/0174907 A1* | 7/2010 | Semple | .............. | H04L 63/0853 |
| | | | | 713/169 |
| 2011/0072274 A1* | 3/2011 | Leoutsarakos | ...... | H04L 63/0823 |
| | | | | 713/182 |
| 2011/0258454 A1* | 10/2011 | Qiu | ........................ | H04L 63/10 |
| | | | | 713/176 |
| 2014/0331297 A1* | 11/2014 | Innes | ..................... | H04L 63/08 |
| | | | | 726/7 |
| 2015/0281219 A1* | 10/2015 | Kostiainen | ............ | H04L 9/3247 |
| | | | | 713/156 |

* cited by examiner

SPOOFING PROTECTION FOR SECURE-ELEMENT IDENTIFIERS

CROSS REFERENCE TO RELATED APPLICATION

This application claims priority under 35 U.S.C. § 119(e) to U.S. Provisional Application Ser. No. 61/921,697, entitled "Spoofing Protection for Secure-Element Identifiers," by Ahmer A. Khan, filed on Dec. 30, 2013, the contents of which are herein incorporated by reference.

BACKGROUND

Field

The described embodiments relate generally to wireless communications, wireless electronic devices, and more specifically techniques for preventing secure-element-identifier spoofing by using a digital signature while communicating with the secure-element identifier.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface).

There is presently increasing interest in using electronic devices to conduct financial transactions. However, because of the sensitivity of such financial transactions, it is advantageous to incorporate a secure element into an electronic device to facilitate financial transactions by providing: security, confidentiality, and one or more application environments. For example, the secure element may include one or more applets or applications (such as a payment applet associated with a credit card) that execute in an environment of the secure element. These applets may allow the secure element to conduct a financial transaction with another electronic device, such as a point-of-sale terminal.

Moreover, the applets or the applications may be updated as needed. These updating operations may be conducted by a remote trusted services manager (which is sometimes referred to as a 'hardware security manager'), such as a server that loads content onto the secure element. In order to maintain the security of the secure element, the trusted services manager may request a secure-element identifier from the secure element to ensure that it is safe to provide an update for an applet or an application on the secure element).

However, if a malicious third party intercepts the secure-element identifier when the secure element communicates it to the trusted services manager, then the intercepted secure-element identifier could be subsequently provided by the malicious third party to the trusted services manager. (This is sometimes referred to as a 'replay' attack.) In this case, the trusted services manager could be tricked into providing an update for an applet (with sensitive financial information) to the malicious third party instead of the secure element, which undermines the security of the entire system.

Thus, in spite of the considerable effort already devoted to the development of technology to support wireless financial transactions, further improvements are desirable.

SUMMARY

The described embodiments relate to an electronic device that includes: an antenna; an interface circuit that wirelessly communicates with another electronic device; and a secure element. During operation, the secure element: receives, from the other electronic device (such as a trusted services manager that loads content onto the secure element), a challenge and a request for a secure-element identifier of the secure element; and in response provides, to the other electronic device, the secure-element identifier, a certificate associated with a provider of the secure element, and a digital signature, where the digital signature includes a signed version of the secure-element identifier and the challenge.

Note that the certificate may include a digital certificate associated with a controlling authority security domain in the secure element, and the controlling authority security domain is associated with the provider of the secure element.

In response to receiving the challenge, the secure element may generate the digital signature by encrypting the challenge and the secure-element identifier using an encryption key associated with the provider. Furthermore, prior to the encryption, the secure element may hash the secure-element identifier and the challenge.

In some embodiments, the electronic device includes: a processor; and memory that stores a program module executed by the processor. The program module includes: instructions for receiving, from a user, an identifier (such as a username, a password and/or a biometric identifier of the user); instructions for providing, to a third electronic device, the identifier; instructions for receiving, from the third electronic device, a sign-in token that is based on the identifier; and instructions for providing, to the secure element, the sign-in token. In these embodiments, prior to the encryption, the secure element may hash the secure-element identifier, the challenge and the sign-in token of a user of the electronic device. Furthermore, after the encryption, the secure element may add the sign-in token to the digital signature.

Another embodiment provides the secure element for use with the electronic device.

Another embodiment provides a computer-program product for use with the electronic device. This computer-program product includes instructions for at least some of the operations performed by the electronic device.

Another embodiment provides a method for certifying the secure-element, which may be performed by a processor in the secure element in the electronic device. While performing the method, the electronic device may: receive, from the other electronic device, the challenge and a request for the secure-element identifier of the secure element; and provide, to the other electronic device, the secure-element identifier, the certificate associated with the provider of the secure element, and the digital signature.

Another embodiment provides an electronic device that includes: an antenna; an interface circuit that wirelessly communicates with a second electronic device and a third electronic device; a secure element; a processor; and memory that stores a program module that is executed by the processor. During operation, when executing the program module, the processor: provides, to the third electronic device (which, for example, can be a provider of the electronic device), an identifier of a user (such as a username, a password and/or a biometric identifier of the user); receives, from the third electronic device, a sign-in token that is based on the identifier; provides the sign-in token and a request to the secure element for a secure-element identifier; receives, from the secure element, the secure-element identifier, a certificate associated with a provider of the secure element, a digital signature that includes a signed version of the sign-in token and the secure element identifier; and provides, to the second electronic device (which, for example, can be a trusted services manager that loads content onto the secure element), the secure-element identifier, the certificate, the digital signature, and the sign-in token.

In some embodiments, when executing the program module, the processor: receives, from the second electronic device, the challenge; and provides, to the secure element, the challenge. Moreover, the secure element may generate the digital signature by encrypting the challenge, the secure element identifier and the sign-in token using an encryption key associated with the provider.

Note that the certificate may include a digital certificate associated with a controlling authority security domain in the secure element, and the controlling authority security domain may be associated with the provider of the secure element.

In some embodiments, prior to the encryption, the secure element hashes the secure-element identifier, the challenge and the sign-in token.

Another embodiment provides a computer-program product for use with the electronic device. This computer-program product includes instructions for at least some of the operations performed by the electronic device.

Another embodiment provides a method for certifying the secure-element, which may be performed by a processor in the electronic device. During the method, the processor: provides, to the third electronic device, the identifier of the user; receives, from the third electronic device, the sign-in token that is based on the identifier; provides the sign-in token and the request to the secure element for the secure-element identifier; receives, from the secure element, the secure-element identifier, the certificate, and the digital signature; and provides, to the second electronic device, the secure-element identifier, the certificate, the digital signature, and the sign-in token.

The preceding summary is provided merely for purposes of summarizing some exemplary embodiments to provide a basic understanding of some aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In response to a challenge and a request for a secure-element identifier associated with a secure element in an electronic device (such as a cellular telephone), which are received from another electronic device (such as a trusted services manager that loads content onto the secure element), the secure element may provide to the other electronic device: the secure-element identifier, a certificate associated with a provider of the secure element, and a digital signature. The digital signature may include a signed version of the challenge and the secure-element identifier, which are encrypted using an encryption key associated with a provider of the secure element. In this way, the other electronic device may certify the secure element.

For example, the wireless communication between the electronic device and the other electronic device may involve conveying packets that are transmitted and received by radios in the electronic device and the other electronic device in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In addition, the communication protocol may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, a cellular-telephone communication technique is used as an illustrative example.

Figure 1:
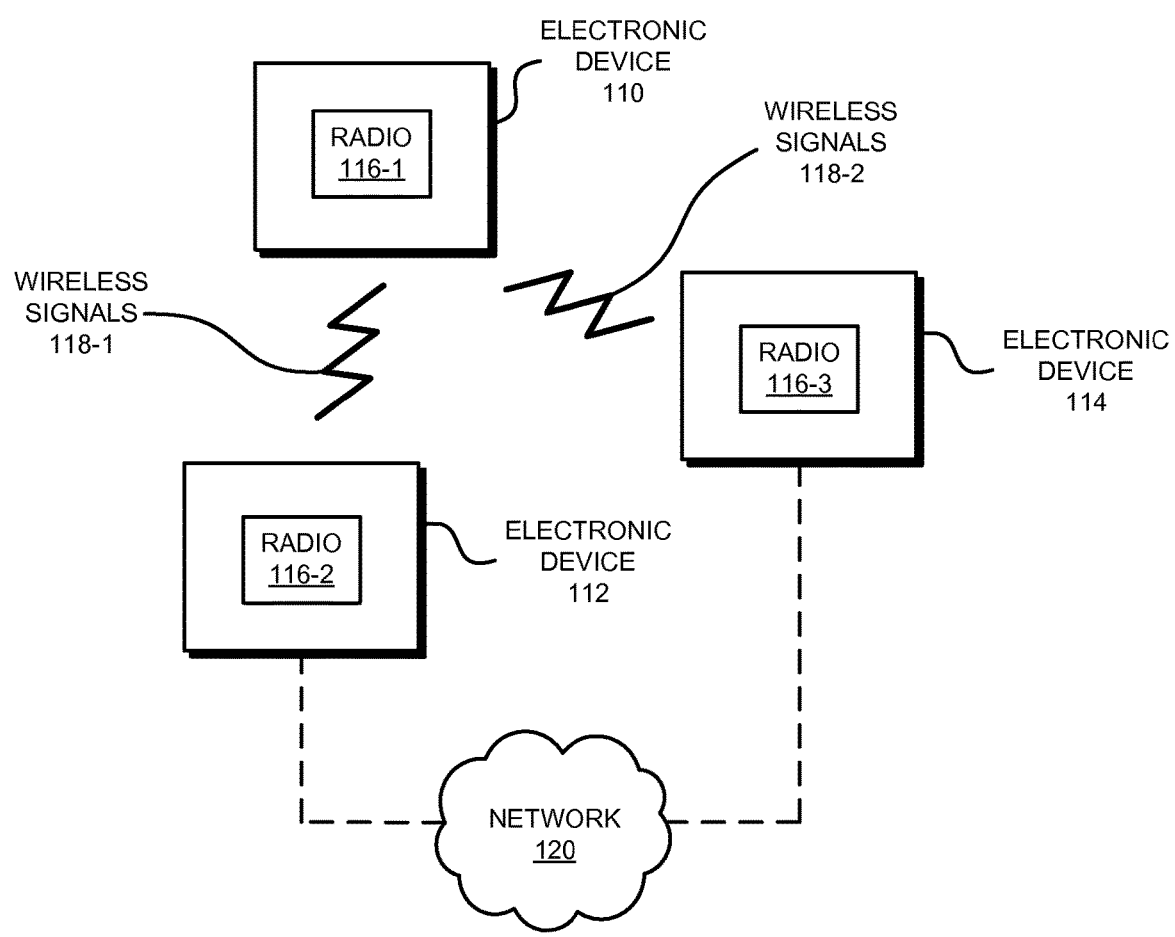
FIG. 1 is a block diagram illustrating electronic devices wirelessly communicating during a financial transaction in accordance with an embodiment of the present disclosure.

The communication between the electronic device and the other electronic device is shown in FIG. 1, which presents a block diagram illustrating electronic devices 110 and 112 wirelessly communicating. These electronic devices may wirelessly communicate when certifying the secure element in electronic device 110 (such as a cellular telephone). In particular, electronic device 112 may be a trusted services manager that loads content onto the secure element in electronic device 110. Before providing the content to the secure element, electronic devices 110 and 112 may undergo a certification procedure to confirm that the secure element is valid. As described further below with reference to FIGS. 4-6, this certification procedure may involve a series of requests and responses (or handshaking) between electronic devices 110 and 112 that certify the secure element, and which may involve wireless communication. Specifically, the secure element may provide to electronic device 112 a secure-element identifier in response to a challenge (such as a random or a pseudorandom number) and a request received from electronic device 112. Moreover, the secure element may provide to electronic device 112 a certificate associated with a provider of the secure element and/or a digital signature, where the digital signature includes a signed version of the challenge and the secure-element identifier. The digital signature may be generated by encrypting the challenge and the secure-element identifier using an encryption key associated with a provider of the secure element.

In some embodiments, a processor in electronic device 110 provides an identifier of a user of electronic device 110 (such as a username, a password and/or a biometric identifier) to electronic device 114 (such as a server associated with a provider of electronic device 110 and, more generally, hardware under the control of and/or otherwise performing actions on behalf of the provider of electronic device 110), and electronic device 114 responds by providing a sign-in token that is based on the identifier. This sign-in token may also be provided to and used by the secure element when generating the digital signature. For example, the secure element may generate the digital signature by encrypting a secure hashing (such as SHA-256) of the challenge, the secure-element identifier and the sign-in token.

More generally, electronic device 112 may issue a challenge to electronic device 110 prior to providing content to the secure element, and electronic device 110 may respond by providing the secure-element identifier, the certificate, and the digital signature.

Alternatively, as described further below with reference to FIGS. 7 and 8, the certification procedure may involve a series of requests and responses (or handshaking) among electronic devices 110, 112 and 114 that certify the secure element, and which may involve wireless communication. In particular, in response to the processor in electronic device 110 providing the identifier, electronic device 114 may provide the sign-in token that is based on the identifier. Then, in response to the sign-in token and a request received from the processor in electronic device 110, the secure element may provide to the processor the secure-element identifier, the certificate, and/or a digital signature, which includes a signed version of the secure-element identifier and the sign-in token. The digital signature may be generated by encrypting the sign-in token and the secure-element identifier using the encryption key associated with the provider of the secure element. Furthermore, the processor may then provide the secure-element identifier, the certificate, the digital signature, and the sign-in token to electronic device 112. Note that electronic device 112 may communicate with electronic device 114 to confirm that the sign-in token is valid, i.e., that the user of electronic device 110 has signed in.

In some embodiments, electronic device 112 provides the challenge to the processor, which then provides the challenge to the secure element. The challenge may also be used by the secure element when generating the digital signature. For example, the secure element may generate the digital signature by encrypting a secure hashing of the challenge, the secure-element identifier and the sign-in token.

In these ways, electronic device 112 may certify that the secure element in electronic device 110 is valid and that there is a secure chain of certifications going back to the provider of the secure element before providing the content.

The wireless communication among electronic devices 110, 112 and/or 114 may involve the exchange of packets that include the certification information (such as the secure-element identifier, the identifier, the certificate, the challenge, the sign-in token, and/or the digital signature). These packets may be included in frames in one or more wireless channels.

As described further below with reference to FIG. 2, electronic devices 110, 112 and 114 may include subsystems, such as: a networking subsystem, a memory subsystem, a processing subsystem and a secure subsystem. In addition, electronic devices 110, 112 and 114 may include radios 116 in the networking subsystems. More generally, electronic devices 110, 112 and 114 can include (or can be included within) any electronic devices with networking subsystems that enable electronic devices 110, 112 and 114 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 118-1 (represented by a jagged line) are transmitted from a radio 116-1 in electronic device 110. These wireless signals are received by radio 116-2 in electronic device 112. Similarly, wireless signals 118-2 (represented by a jagged line) are transmitted from radio 116-1, and are received by radio 116-3 in electronic device 114. (Note that the communication among electronic devices 110, 112 and/or 114 may also occur via network 120, which may involve wired communication with a different communication protocol than wireless signals 118.) Moreover, the wireless communication may or may not involve a connection being established among electronic devices 110, 112 and/or 114, and therefore may or may not involve communication via a wireless network (such as a cellular-telephone network).

In the described embodiments, processing a packet or frame in electronic devices 110, 112 and 114 includes: receiving wireless signals 118 with the packet or frame; decoding/extracting the packet or frame from received wireless signals 118 to acquire the packet or frame; and processing the packet or frame to determine information contained in the packet or frame (such as the certification information).

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 110. This electronic device includes processing subsystem 210, memory subsystem 212, networking subsystem 214, authentication subsystem 216 and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220 (which is a system-on-chip within one or more processors in processing subsystem 210) that performs security services for other components in the processing subsystem 210 and that securely communicates with other subsystems in electronic device 110. Secure enclave processor 220 may include one or more processors, a secure boot ROM, one or more security peripherals, and/or other components. The security peripherals may be hardware-configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230.

Memory subsystem 212 includes one or more devices for storing data and/or instructions for processing subsystem 210, networking subsystem 214, authentication subsystem 216 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an antenna 224. For example, networking subsystem 214 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110 may use the mechanisms in networking subsystem 214 for performing simple wireless communication among electronic devices 110, 112 (FIG. 1) and 114 (FIG. 1), e.g., transmitting advertising frames and/or near-field communication.

Authentication subsystem 216 may include one or more processors, controllers and devices for receiving the authentication information from a user of electronic device 110, and for securely communicating this authentication information to processing subsystem 210 (such as by encrypting the authentication information). For example, the authentication information may include: a biometric identifier acquired by a biometric sensor 226 (such as: a fingerprint sensor, a retinal sensor, a palm sensor, a digital signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 110 that is received using user-interface device 228.

Furthermore, secure subsystem 218 may include a secure element 230, which includes one or more processors and memory. Note that secure element 230 may be a tamper-resistant component that is used in electronic device 110 to provide the security, confidentiality, and multiple application environments required to support various business models. Secure element 230 may exist in one or more of a variety of form factors, such as: a universal integrated circuit card (UICC), an embedded secure element (on a circuit board in electronic device 110), a smart secure digital (SD) card, a smart microSD card, etc.

Moreover, secure element 230 may include one or more applets or applications that execute in an environment of secure element 230 (such as in the operating system of secure element 230, and/or in a Java runtime environment executing on the secure element 230). For example, the one or more applets may include an authentication applet that: performs contactless registry services, encrypts/decrypts packets or tokens communicated with secure enclave processor 220, sets one or more software flags (such as an authentication-complete flag) in an operating system of secure element 230, and/or conveys information to one or more payment applets 236. The one or more applets may include one or more payment applets 236 that conduct financial transactions with electronic device 112 (FIG. 1) when they are activated by program module 246, and based on the one or more software flags and/or when electronic device 110 is proximate to electronic device 112 (FIG. 1). In particular, payment applets 236 may each be associated with a financial vehicle (such as a credit card, a debit card or a financial vehicle associated with a financial account). In addition, as described further below with reference to FIG. 3, secure element 230 may include certification information 234, such as: a secure-element identifier, a certificate (such as a public key certification) of a provider of secure element 230, and one or more encryption keys associated with the provider (such as a public encryption key and a private encryption key).

Authentication applet 308 may execute in a master or issuer security domain in secure element 230 (such as controlling authority security domain or CASD 232), while payment applets 236 may execute in supplemental security domains. In addition, certification information 234 may be included in CASD 232. Communication between these security domains may be encrypted using different encryption/decryption keys that are security-domain specific. In electronic device 110 and/or during communication between electronic devices 110 and 112 (FIG. 1), encryption/decryption may involve symmetric and/or asymmetric encryption. In addition, as described further below with reference to FIGS. 4-8, the information communicated may also include a digital signature that is specific to electronic device 110 and/or components in electronic device 110, such as secure element 230.

Figure 3:
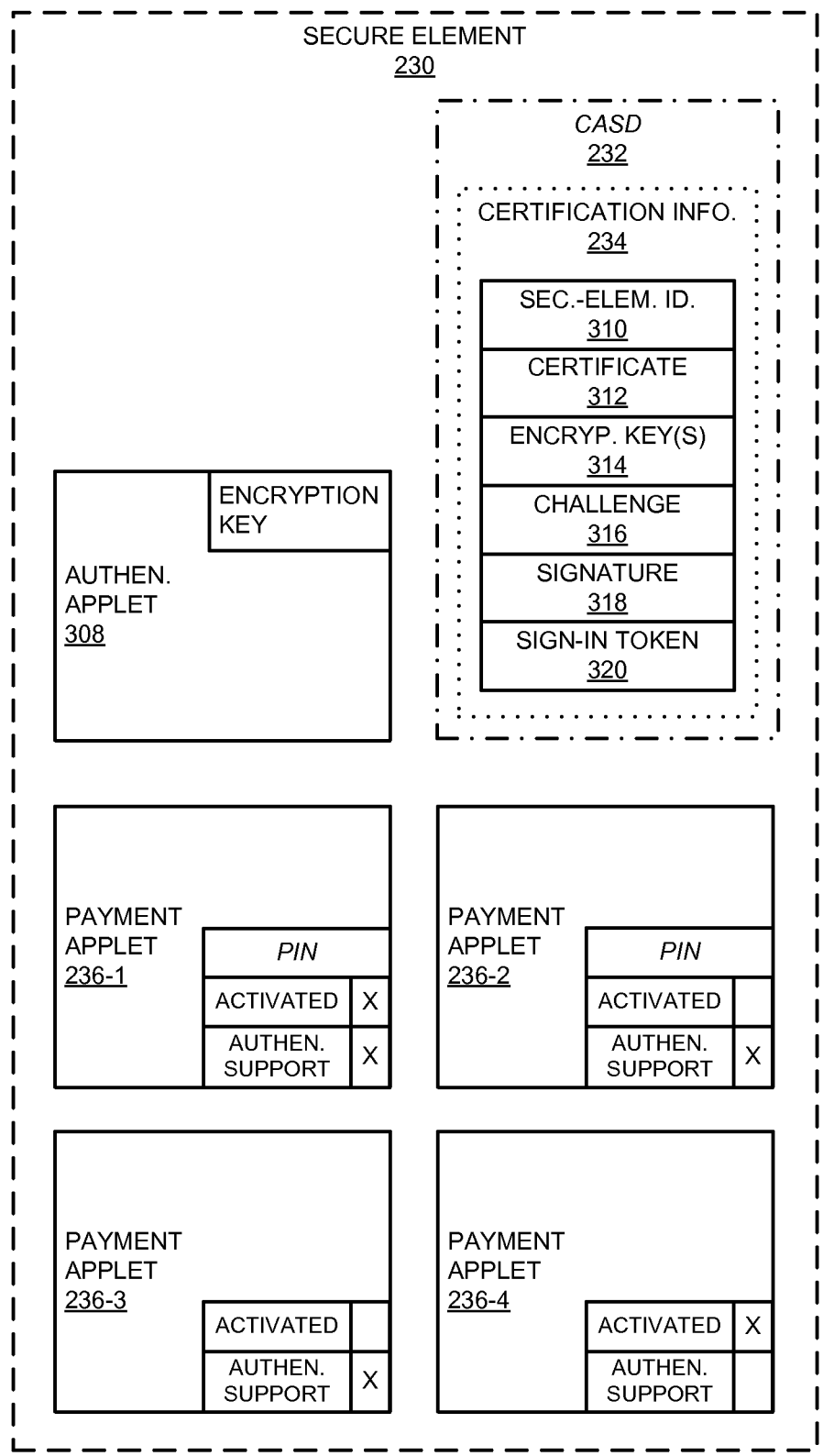
FIG. 3 is a block diagram illustrating the secure element in the electronic device in FIG. 2 in accordance with an embodiment of the present disclosure.

The data stored in secure element 230 is further illustrated in FIG. 3. In particular, for each of payment applets 236, secure element 230 may store: whether a given payment applet is active (in response to an activation command); and whether or not an authentication-complete flag is supported by/applies to the given payment applet. In some embodiments there are one or more payment applets (such as payment applet 236-4) for which authentication-complete flag does not apply. In some embodiments, secure element 230 stores, for at least one of payment applets 236, a PIN or a debit-card number that is associated with this payment applet. For example, as shown in FIG. 3, payment applets 236-1 and 236-2 may store associated PINs. Additionally, one or more of the payment applets may store associated financial-account information.

During operation of electronic device 110, the user may use passbook 248 to select or activate one or more of payment applets 236 (such as payment applets 236-1 and 236-4). If payment applet 236-1 supports the authentication-complete flag (as indicated by the enabling or setting of authentication support in payment applet 236-1), in order for payment applet 236-1 to conduct a financial transaction with electronic device 112 (FIG. 1), payment applet 236-1 may need to be activated and the authentication-complete flag may need to be set or enabled in secure element 230 (indicating that the user has been authenticated). In contrast, for payment applet 236-4, which does not support the authentication-complete flag (as indicated by disabling of authentication support in payment applet 236-4), a financial transaction may be conducted when payment applet 236-4 is active (i.e., operation of payment applet 236-4 is not gated by the setting or enabling of the authentication-complete flag in secure element 230). While the present discussion illustrates the use of a global authentication-complete flag, note that in some embodiments there are separate authentication-complete flags associated with at least some of the payment applets 236 (i.e., there may be a specific authentication-complete flag for payment applet 236-1, etc.).

When interface circuit 222 indicates that electronic device 110 is proximate to electronic device 112 (FIG. 1), one of the activated and/or authenticated payment applets 236 (such as payment applet 236-1) may provide the associated financial-account information to interface circuit 222. Then, interface circuit 222 may communicate the financial-account information to electronic device 112 (FIG. 1) using antenna 224.

Payment applets 236 may be provisioned when secure element 230 was fabricated. However, there may be a need to modify information in secure element 230 during operation of electronic device 110 (e.g., one or more of payment applets 236 may need to be updated, one or more new payment applets 236 may need to be installed, and/or information in CASD 232 may need to be modified). As discussed previously, the content associated with these changes may be provided by a trusted services manager, such as electronic device 112 in FIG. 1. However, before providing the content, the trusted services manager may certify that secure element 230 is valid.

Figure 4:
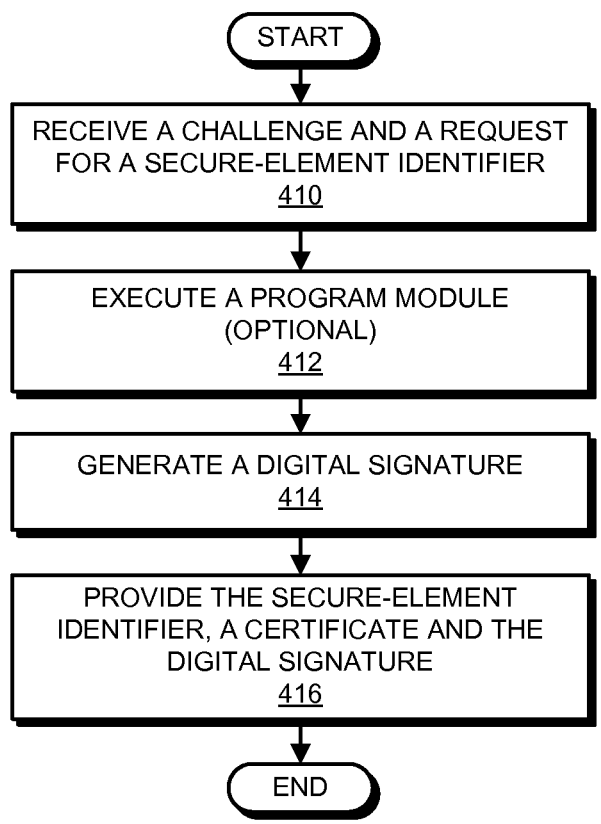
FIG. 4 is a flow diagram illustrating a method for certifying a secure element in one of the electronic devices in FIG. 1 in accordance with an embodiment of the present disclosure.
Figure 5:
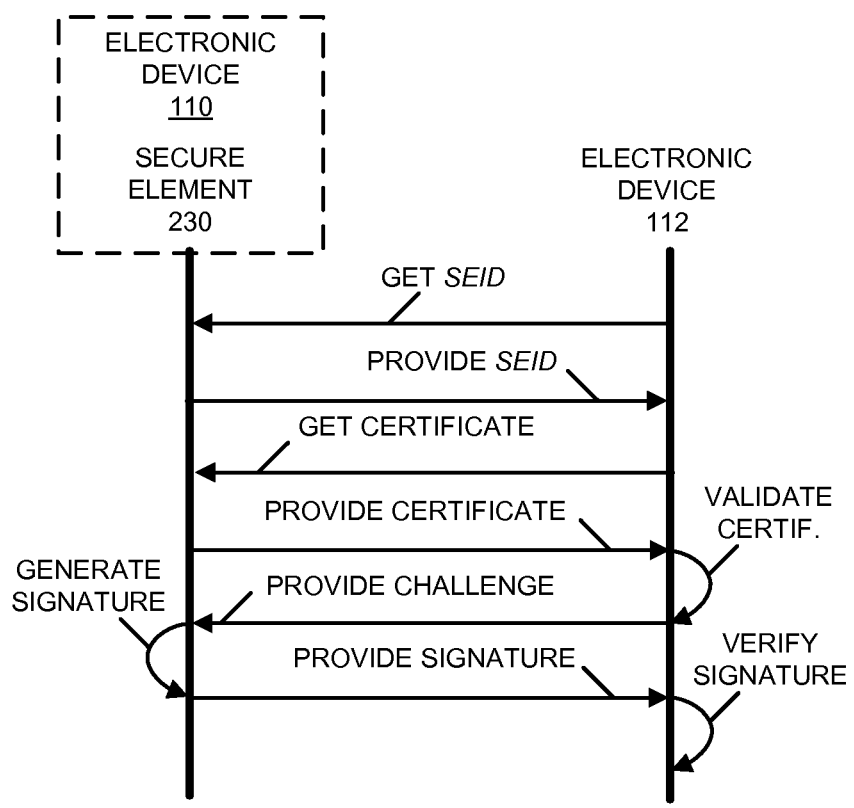
FIG. 5 is a drawing illustrating communication among the electronic devices of FIG. 1 in accordance with an embodiment of the present disclosure.
Figure 6:
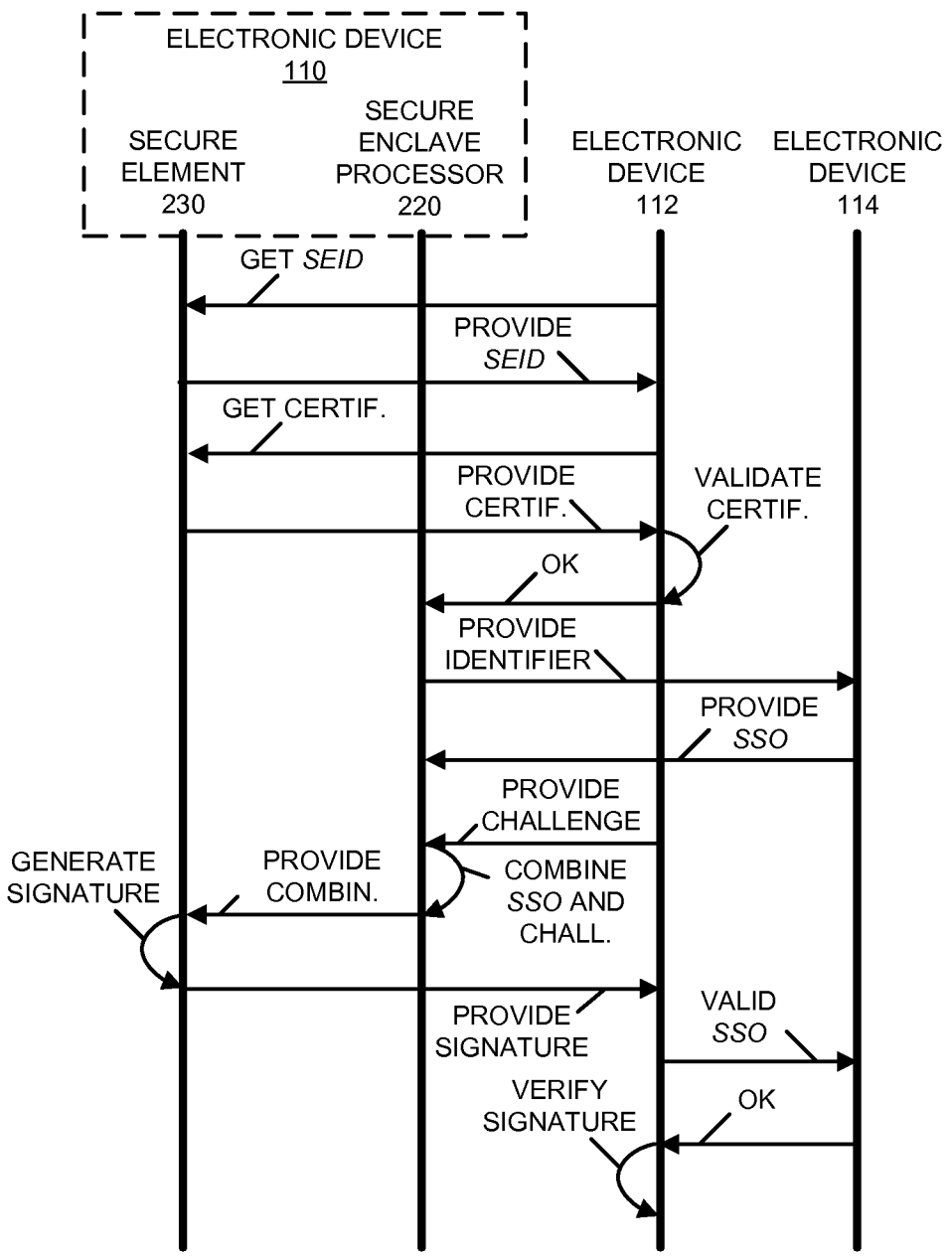
FIG. 6 is a drawing illustrating communication among the electronic devices of FIG. 1 in accordance with an embodiment of the present disclosure.

The certification procedure may leverage certification information 234. This certification information may include: a secure-element identifier 310, a certificate 312 (such as a public key certification) of a provider of secure element 230, and one or more encryption keys 314 associated with the provider (such as a public encryption key and a private encryption key). In particular, during the certification procedure the operating system of secure element 230 (or software executing in this environment) may receive a challenge 316 and a request for secure-element identifier 310 from electronic device 112 (FIG. 1). As illustrated in FIG. 4, this information may be included in a single message or, as illustrated in FIGS. 5 and 6), may be included in a series of messages that are communicated to secure element 230.

In response, secure element 230 may provide (using networking subsystem 214 in FIG. 2) to electronic device 112 (FIG. 1): secure-element identifier 310, certificate 312 and a digital signature 318. This digital signature may be generated by secure element 230 based on secure-element identifier 310 and challenge 316. For example, secure element 230 may encrypt, using one of encryption keys 314 (such as a private encryption key), a secure hash of secure-element identifier 310 and challenge 316.

In some embodiments, digital signature 318 is also based on sign-in token 320, which is received from electronic device 114 (FIG. 1). In particular, when the user signs in to electronic device 110 in FIG. 2, they may provide an identifier. For example, processing subsystem 210 may display, on a display subsystem 240, instructions to provide the identifier when executing passbook 248. Then, the user may provide the identifier in the form of a username and/or a password entered using user-interface device 228 in FIG. 2, or a biometric identifier acquired using biometric sensor 226 in FIG. 2. Processing subsystem 210 may instruct networking subsystem 214 to provide the identifier to electronic device 114 (FIG. 1). Sign-in token 320 may be received in response. Next, processing subsystem 210 may provide sign-in token 320 to secure element 230 for subsequent use in generating the digital signature (secure hash, encryption, etc.).

Alternatively, during the certification procedure operating system 244 or a program module 246 executed by processing subsystem 210 may receive a request for secure-element identifier 310 from electronic device 112 (FIG. 1). Then, processing subsystem 210 may communicate the request and sign-in token 320 to secure element 230. As illustrated in FIG. 7, this information may be included in a single message or, as illustrated in FIG. 8, may be included in a series of messages that are communicated to secure element 230.

In response, secure element 230 may provide: secure-element identifier 310, certificate 312 and a digital signature 318. This digital signature may be generated by secure element 230 based on secure-element identifier 310 and sign-in token 320. For example, secure element 230 may encrypt, using one of encryption keys 314 (such as a private encryption key), a secure hash of secure-element identifier 310 and sign-in token 320. Furthermore, processing subsystem 210 may provide this information to electronic device 112 (FIG. 1) using networking subsystem 214 (FIG. 2).

In some embodiments, digital signature 318 is also based on challenge 316, which is received by processing subsystem 210 from electronic device 112 (FIG. 1), and which is communicated to secure element 230. Secure element 230 may use challenge 316 when generating digital signature 318 (secure hash, encryption, etc.).

Referring back to FIG. 2, within electronic device 110, processing subsystem 210, memory subsystem 212, networking subsystem 214, authentication subsystem 216 and secure subsystem 218 may be coupled together using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 110 can detect tampering with secure components (such as secure enclave processor 220, secure element 230 and/or bus 238) and may destroy encryption/decryption keys or authentication information (such as a stored biometric identifier) if tampering is detected.

In some embodiments, the electronic device includes display subsystem 240 for displaying information on a display, which may include a display driver and the display, such as a liquid-crystal display, a multi-touch touchscreen, etc. In addition, in some embodiments the electronic device includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Electronic device 110 can be (or can be included in) any electronic device with at least one network interface. For example, electronic device 110 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems and/or secure I/O subsystems. Additionally, one or more of the subsystems may not be present in electronic device 110. Moreover, in some embodiments, electronic device 110 may include one or more additional subsystems that are not shown in FIG. 2. For example, electronic device 110 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 110. For example, in some embodiments program module 246 is included in operating system 244. Alternatively or additionally, at least some of the functionality of program module 246 may be included in passbook 248.

Moreover, the circuits and components in electronic device 110 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 110. Moreover, the integrated circuit may include hardware and/or software mechanisms that are used for transmitting wireless signals from electronic device 110 to, and receiving signals at electronic device 110 from, electronic device 112 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a cellular-telephone network was used as an illustrative example, the described embodiments of the certification technique may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

While the preceding discussion focused on the hardware, software and functionality in electronic device 110, electronic devices 112 (FIG. 1) and/or 114 (FIG. 1) may have the same or similar hardware (processors, memory, networking interfaces, etc.) and/or software to support the operations performed by these entities, as described further below with reference to FIGS. 4-8. In particular, these entities may include one or more computer systems with a processing subsystem that executes one or more program modules stored in a memory subsystem to perform the operations, and one or more networking interfaces for communicating with other electronic devices, such as electronic device 110.

We now describe embodiments of the certification technique. FIG. 4 presents a flow diagram illustrating a method 400 for certifying a secure element, which may be performed by a processor in a secure element in an electronic device (such as electronic device 110 in FIGS. 1 and 2). During operation, the processor receives, from another electronic device (such as electronic device 112 in FIG. 1), a challenge and a request for a secure-element identifier of the secure element (operation 410). For example, the other electronic device may be a trusted services manager that loads content onto the secure element. Moreover, the challenge may be a randomly generated or a pseudorandomly generated number (such as up to a 176-byte number), and the secure-element identifier may uniquely specify the secure element.

Then, in response to receiving the challenge (operation 410), the processor optionally generates a digital signature (operation 414) by: hashing the secure-element identifier and the challenge; and/or encrypting the challenge and the secure-element identifier using an encryption key (such as a private encryption key) associated with the provider. Note that the digital signature may include a signed version of the secure-element identifier and the challenge. For example, the secure element may generate the digital signature by signing (using the encryption key) the hash of the secure-element identifier and the challenge. In an exemplary embodiment, 16 bytes of the challenge is used to generate the digital signature.

Furthermore, the processor provides, to the other electronic device, the secure-element identifier, a certificate associated with a provider of the secure element, and a digital signature (operation 416). Note that the certificate may include a digital certificate associated with a controlling authority security domain in the secure element, which is associated with the provider of the secure element.

Figure 2:
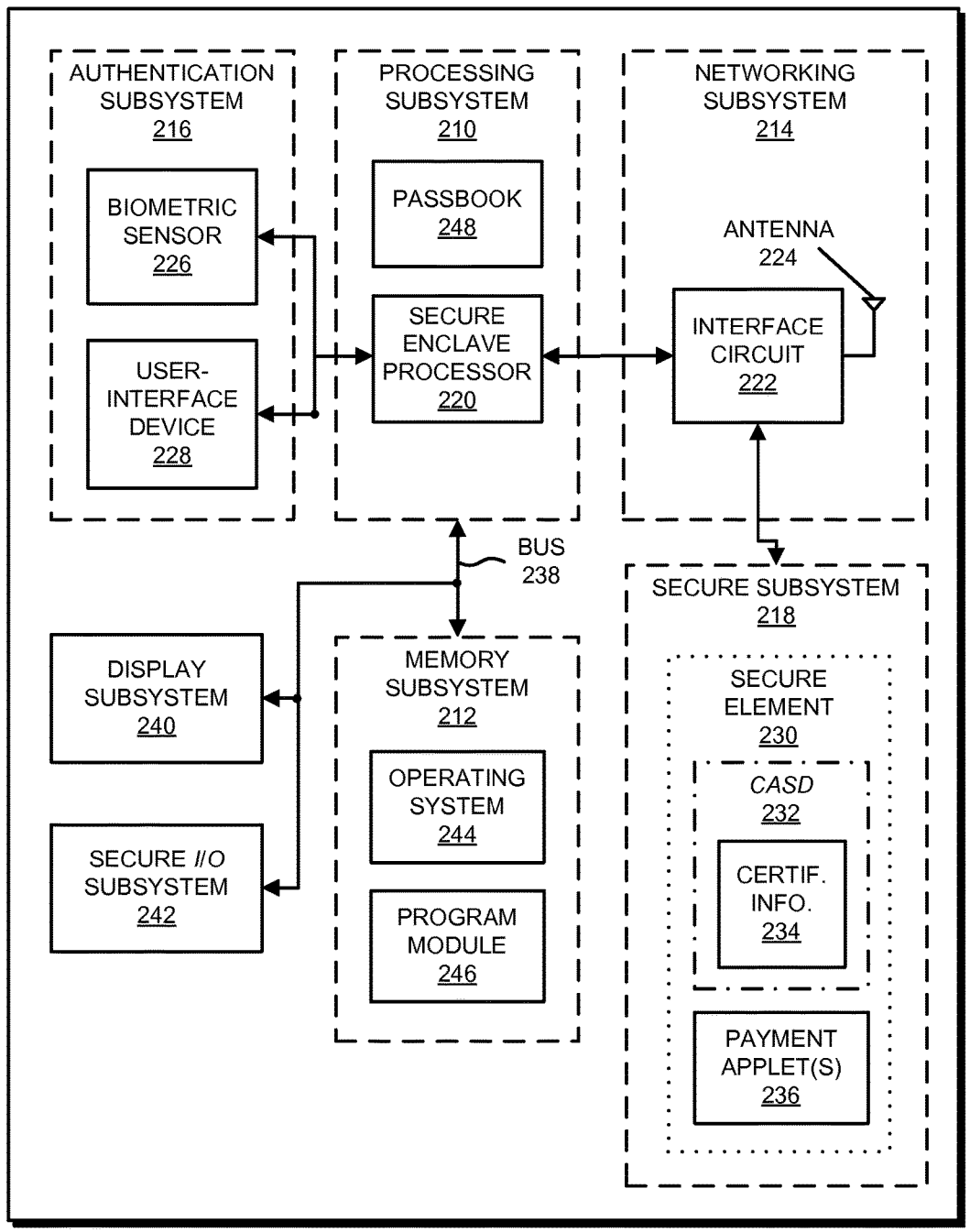
FIG. 2 is a block diagram illustrating one of the electronic devices of FIG. 1 in accordance with an embodiment of the present disclosure.

In some embodiments, another processor in the electronic device (such as secure enclave processor 220 in FIG. 2) optionally executes a program module (operation 412), such as program module 246 in FIG. 2). When executing the program module, the other processor: receives, from a user, an identifier (such as a username, a password and/or a biometric identifier of the user); provides, to a third electronic device (such as electronic device 114 in FIG. 1), the identifier; receives, from the third electronic device, a sign-in token (such as a single sign-in token) that is based on the identifier; and provides, to the secure element, the sign-in token. In these embodiments, prior to the encryption, the secure element may hash the secure-element identifier, the challenge and the sign-in token of a user of the electronic device. For example, the secure element may generate the digital signature by signing (using the encryption key) the hash of the secure-element identifier with the combination of the challenge and the sign-in token. In an exemplary embodiment, the combination of the challenge and the sign-in token has a length of 32 bytes.

Furthermore, after the encryption, the secure element may add the sign-in token to the digital signature. By including the sign-in token in the clear (i.e., an unencrypted version of the sign-in token) with the digital signature, the other electronic device may be able to analyze the digital signature. In addition, the use of the sign-in token in the certification procedure may allow the other electronic device to confirm that the user has signed in to the electronic device.

Note that method 400 may be used for certification of the secure element whenever the trusted services manager communicates with the secure element.

We now describe FIG. 5, which presents a drawing illustrating communication within electronic device 110 (FIG. 1) and between electronic devices 110 and 112 (FIG. 1), and which provides further information regarding the aforementioned certification technique of FIG. 4. In particular, electronic device 112 may request the secure-element identifier (SEID) from secure element 230 in electronic device 110. In response, secure element 230 may access the controlling authority security domain to obtain the secure-element identifier, and may provide the secure-element identifier to electronic device 112.

Then, electronic device 112 may request the certification. In response, secure element 230 may access the controlling authority security domain to obtain the certificate, and may provide the certificate to electronic device 112.

After validating the certification (e.g., using information about the provider, such as the certificate, available to electronic device 112), electronic device 112 may provide the challenge to secure element 230. Using the challenge and the secure-element identifier, secure element 230 may access the controlling authority security domain to obtain the encryption key, and may generate the digital signature. In particular, secure element 230 may sign the secure-element identifier and the challenge using a secure hash technique and the encryption key. Next, secure element 230 may provide the digital signature to electronic device 112, which subsequently verifies the digital signature, e.g., using the secure-element identifier, the challenge and the encryption key (which is available to electronic device 112).

As noted previously, in some embodiments the certification technique uses the sign-in token. This is shown in FIG. 6, which presents a drawing illustrating communication among electronic devices 110, 112 and 114 (FIG. 1). In particular, before electronic device 112 provides the challenge, secure enclave processor 220 in electronic device 110 may provide the identifier to electronic device 114. In response, electronic device 114 may provide the single sign-in token (SSO) to secure enclave processor 220.

After receiving the challenge, secure enclave processor 220 may combine the sign-in token with the challenge, and may provide the combination to secure element 230. Next, secure element 230 may sign the secure-element identifier and the combination using the secure hash technique and the encryption key.

Furthermore, secure element 230 may provide the digital signature and the sign-in token to electronic device 112. Electronic device 112 may provide the sign-in token to electronic device 114 to confirm that the sign-in token is valid.

Note that the operations illustrated in FIGS. 5 and 6 may include challenge and response operations, which are not shown for clarity. In addition, communication via interface circuit 222 (FIG. 2) is not shown for clarity.

As noted previously, an alternative process may be used during the certification procedure. This is shown in FIG. 7, which presents a flow diagram illustrating a method 700 for certifying a secure element. Process 700 may be performed by a processor in an electronic device (such as electronic device 110 in FIGS. 1 and 2). During operation, the processor (which may be secure enclave processor 220 in FIG. 2) provides, to a third electronic device (such as electronic device 114 in FIG. 1), the identifier of the user (operation 710). Then, the processor receives, from the third electronic device, the sign-in token that is based on the identifier (operation 712). Moreover, the processor provides the sign-in token and a request for the secure-element identifier to the secure element (operation 714), such as secure element 230. Next, the processor receives, from the secure element, the secure-element identifier, the certificate associated with the provider of the secure element, and a digital signature (operation 720). This digital signature may include a signed version of the sign-in token and the secure-element identifier. Furthermore, the processor provides, to the second electronic device (such as electronic device 112 in FIG. 1), the secure-element identifier, the certificate, the digital signature, and the sign-in token (operation 722).

In some embodiments, the processor optionally receives, from the second electronic device, the challenge (operation 716), and provides, to the secure element, the challenge (operation 716). Moreover, the secure element may optionally generate the digital signature (operation 718) by encrypting the challenge, the secure-element identifier and/or the sign-in token using an encryption key associated with the provider. For example, in embodiments where the challenge is available, the digital signature is based on the challenge, the secure-element identifier and the sign-in token. In particular, the secure-element may perform a secure hash on the challenge, the secure-element identifier and the sign-in token, and then may encrypt at least a portion of an output of the secure hash using the encryption key. Otherwise, the digital signature may be based on the secure element identifier and the sign-in token.

Figure 7:
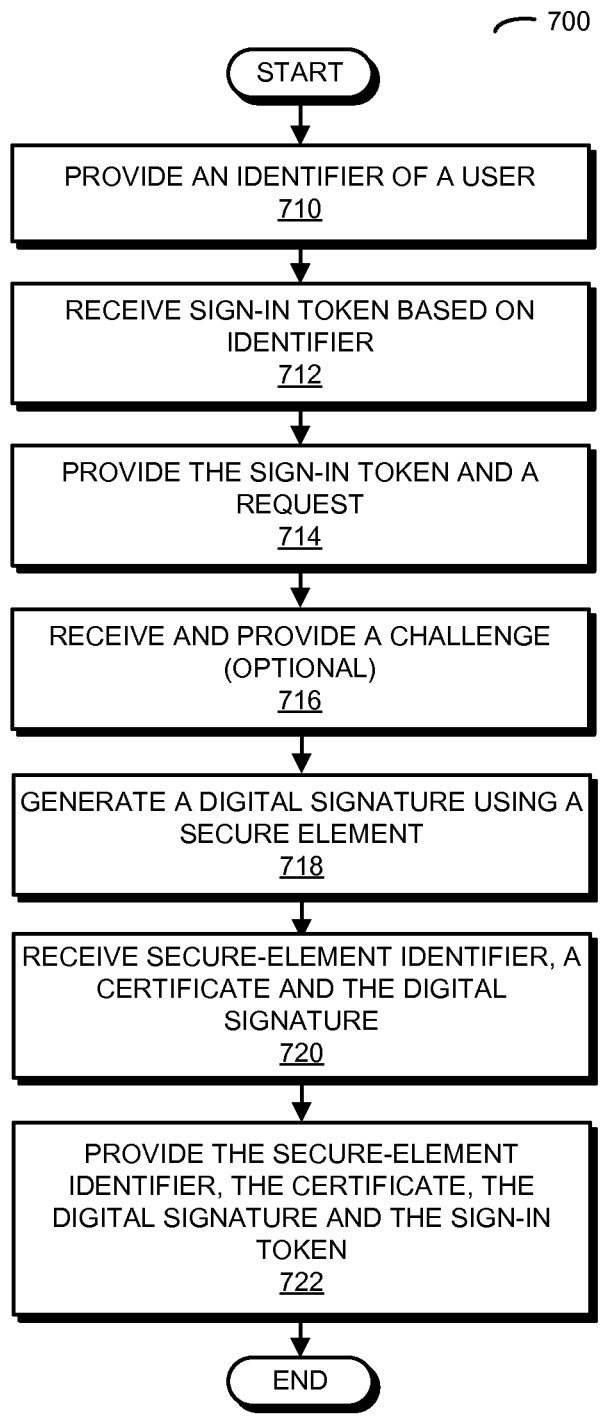
FIG. 7 is a flow diagram illustrating a method for certifying a secure element in one of the electronic devices in FIG. 1 in accordance with an embodiment of the present disclosure.
Figure 8:
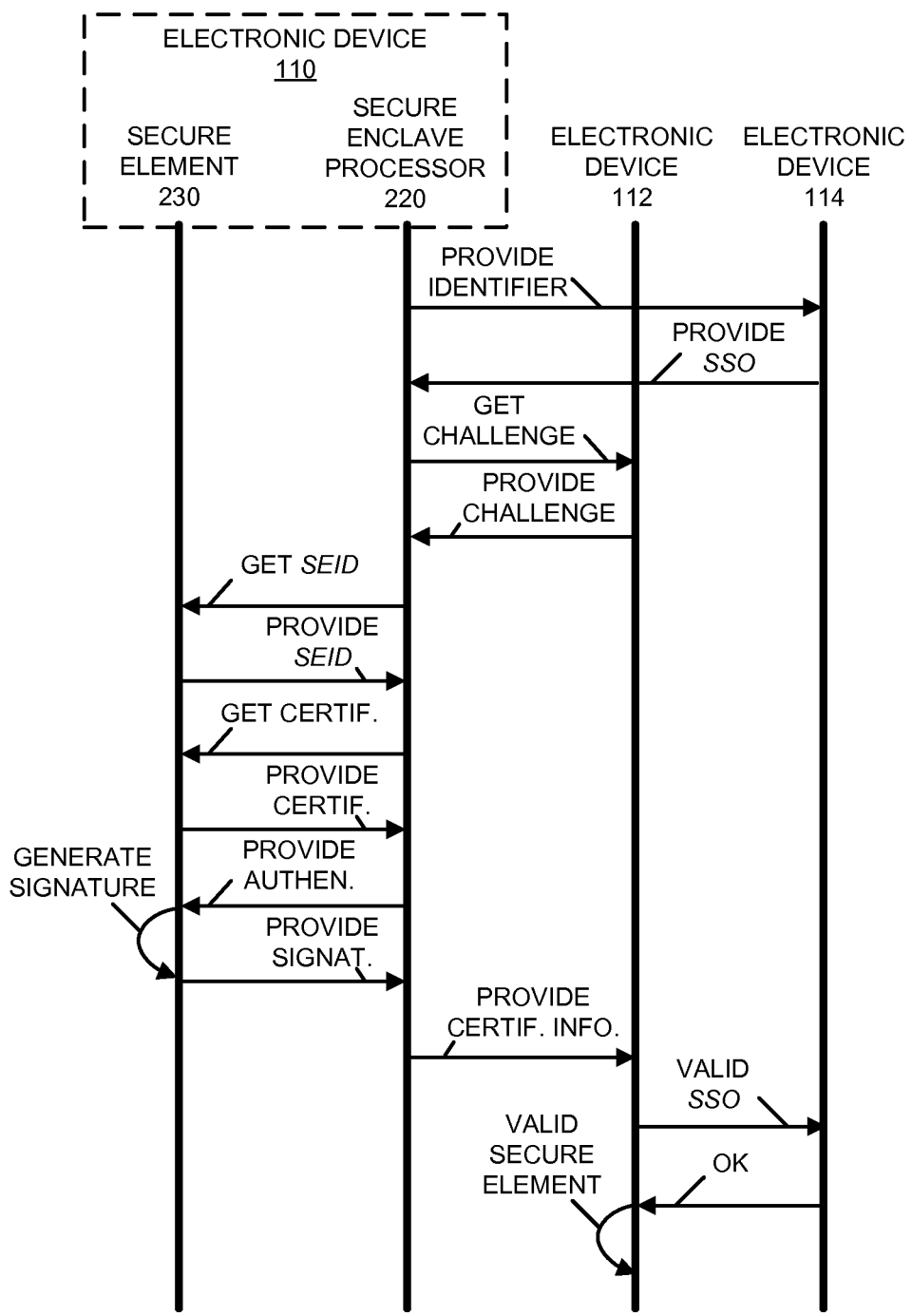
FIG. 8 is a drawing illustrating communication among the electronic devices of FIG. 1 in accordance with an embodiment of the present disclosure.

FIG. 8 presents a drawing illustrating communication within electronic device 110 (FIG. 1) and among electronic devices 110, 112 and 114 (FIG. 1), and which provides further information regarding the aforementioned certification technique of FIG. 7. In particular, secure enclave processor 220 in electronic device 110 may provide the identifier to electronic device 114. In response, electronic device 114 may provide the sign-in token to secure enclave processor 220.

Then, secure enclave processor 220 may optionally request the challenge from electronic device 112. In response, electronic device 112 may optionally provide the challenge to secure enclave processor 220.

Moreover, secure enclave processor 220 may request the secure-element identifier from secure element 230. In response, secure element 230 may access the controlling authority security domain to obtain the secure-element identifier, and then may provide the secure-element identifier to secure enclave processor 220.

Next, secure enclave processor 220 may request the certificate from secure element 230. In response, secure element 230 may access the controlling authority security domain to obtain the certificate, and then may provide the certificate to secure enclave processor 220.

Furthermore, secure enclave processor 220 may provide internal authentication (such as the sign-in token and/or the optional challenge) to secure element 230. Using the sign-in token, the optional certificate and the secure-element identifier, secure element 230 may generate the digital signature using a secure hash and the encryption key. Then, secure element 230 may provide the digital signature to secure enclave processor 220.

Additionally, secure enclave processor 220 may provide certification information (such as the secure-element identifier, the optional certificate, the digital signature and the sign-in token) to electronic device 112, which certifies that secure element 230 is valid using information available to electronic device 112 (such as the optional certificate and the private encryption key associated with the provider of secure element 230). In some embodiments, electronic device 112 communicates with electronic device 114 to confirm that the sign-in token is valid, e.g., using the unencrypted version of the sign-in token that is provided to electronic device 112 by secure enclave processor 220.

Note that the operations illustrated in FIG. 8 may include challenge and response operations, which are not shown for clarity. In addition, communication via interface circuit 222 (FIG. 2) is not shown for clarity.

In these ways, the electronic device may facilitate certification of the secure element by electronic device 112 (FIG. 1) by providing the unique secure-element identifier, end-to-end certification from the provider of the secure element, and a unique digital signature based on the encryption key of the provider.

In some embodiments of methods 400 (FIG. 4) and 700 (FIG. 7), there may be additional or fewer operations. Furthermore, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:
1. An apparatus comprising:
an interface circuit configured to communicate with an electronic device; and
a secure element, coupled to the interface circuit, comprising at least one security domain, the secure element configured to:
execute, in the at least one security domain, an application stored in the secure element;

receive, from the electronic device, a challenge and a request for a secure-element identifier of the secure element;

hash the secure-element identifier and the challenge;

generate, in response to receiving the challenge, a digital signature by encrypting the hashed challenge and the hashed secure-element identifier using an encryption key associated with a provider of the secure element; and provide, to the electronic device, the secure-element identifier, a certificate associated with the provider of the secure element, and the digital signature, wherein the digital signature further comprises a signed version of the challenge and the secure-element identifier.

2. The apparatus of claim 1, wherein the interface circuit is configured to receive content from a trusted-services manager of the electronic device.

3. The apparatus of claim 1, wherein the certificate includes a digital certificate associated with a controlling authority security domain in the secure element; and
wherein the controlling authority security domain is associated with the provider of the secure element.

4. The apparatus of claim 1, further comprising:
a processor; and
memory, coupled to the processor, which stores a program module configured to be executed by the processor, the program module including:
instructions for receiving an identifier;
instructions for providing, to another electronic device, the identifier;
instructions for receiving, from the another electronic device, a sign-in token that is based at least in part on the identifier; and
instructions for providing, to the secure element, the sign-in token;
wherein, prior to the encryption, the secure element is configured to hash the sign-in token; and
wherein the identifier includes one of a username, a password, and a biometric identifier.

5. The apparatus of claim 4, wherein the secure element is further configured to, after the encryption, add the sign-in token to the digital signature.

6. A secure element for use with an electronic device, the secure element comprising:
a processor;
a security domain; and
memory, coupled to the processor, which stores a program module configured to be executed by the processor, the program module including:
instructions for executing, in the security domain, an application stored in the memory;
instructions for receiving, from an electronic device, a challenge and a request for a secure-element identifier of the secure element;
instructions for hashing the secure-element identifier and the challenge;
instructions for generating, in response to receiving the challenge, a digital signature by encrypting the hashed challenge and the hashed secure-element identifier using an encryption key associated with a provider of the secure element; and
instructions for providing, to the electronic device, the secure-element identifier, a certificate associated with the provider of the secure element, and the digital signature, wherein the digital signature includes a signed version of the challenge and the secure-element identifier.

7. A processor-implemented method for certifying a secure element in an apparatus, wherein the method comprises:
executing, in a security domain of the secure element, an application stored in the secure element of the apparatus;
receiving, from an electronic device, a challenge and a request for a secure-element identifier of the secure element;
hashing the secure-element identifier and the challenge;
generating, in response to receiving the challenge, a digital signature by encrypting the hashed challenge and the hashed secure-element identifier using an encryption key associated with a provider of the secure element;
providing, to the electronic device, the secure-element identifier, a certificate associated with the provider of the secure element, and the digital signature, wherein the digital signature includes a signed version of the challenge and the secure-element identifier.

8. An apparatus comprising:
an interface circuit configured to communicate with a first electronic device and a second electronic device;
a processor;
a secure element, comprising at least one security domain, coupled to the processor; and
memory, coupled to the processor, which stores a program module configured to be executed by the processor, the program module including:
instructions for executing, in the at least one security domain, an application stored in the secure element;
instructions for providing, to the second electronic device, an identifier;
instructions for receiving, from the third electronic device, a sign-in token that is based at least in part on the identifier;
instructions for providing the sign-in token and a request to the secure element for a secure-element identifier;
instructions for receiving, from the secure element, the secure-element identifier, a certificate associated with a provider of the secure element, and a digital signature, wherein the digital signature includes a signed version of the secure-element identifier, and the sign-in token;
instructions for providing, to the first electronic device, the secure-element identifier, the certificate, the digital signature, and the sign-in token;
instructions for receiving, from the first electronic device, the challenge;
instructions for hashing the sign-in token, the secure-element identifier, and the challenge; and
instructions for generating the digital signature by encrypting the hashed sign-in token, the hashed challenge, and hashed the secure-element identifier using an encryption key associated with the provider.

9. The apparatus of claim 8, wherein the first electronic device includes a trusted services manager that loads content onto the secure element; and wherein the second electronic device is associated with a provider of the apparatus.

10. The apparatus of claim 8, wherein the certificate includes a digital certificate associated with a controlling authority security domain in the secure element; and wherein the controlling authority security domain is associated with the provider of the secure element.

11. A computer-program product for use in conjunction with an apparatus, the computer-program product comprising a non-transitory computer-readable storage medium and a computer-program mechanism embedded therein, to certify a secure element in the apparatus, the computer-program mechanism including:
- instructions for providing, to a second electronic device, an identifier;
- instructions for receiving, from the second electronic device, a sign-in token that is based at least in part on the identifier;
- instructions for providing the sign-in token and a request to a secure element in the electronic device for a secure-element identifier;
- instructions for executing, in a security domain in the secure element, an application stored in the secure element;
- instructions for receiving, from the secure element, the secure-element identifier, a certificate associated with a provider of the secure element, and a digital signature, wherein the digital signature includes a signed version of the sign-in token and the secure-element identifier;
- instructions for providing, to a first electronic device, the secure-element identifier, the certificate, the digital signature, and the sign-in token;
- instructions for receiving, from the first electronic device, the challenge;
- instructions for hashing the secure-element identifier and the challenge; and
- instructions for providing, to the first electronic device, the challenge, wherein the secure element generates the digital signature by encrypting the sign-in token, the hashed challenged, and the hashed secure-element identifier using an encryption key associated with the provider.

12. The computer-program product of claim 11, wherein the first electronic device receives content from a trusted services manager of the first electronic device; and wherein the second electronic device is associated with a provider of the apparatus.

13. The apparatus of claim 1, wherein the application is a payment application and the secure element is further configured to store financial information associated with the payment application.

14. The apparatus of claim 3, wherein the secure element is further configured to:
- execute, in the controlling authority security domain, another application stored in the secure element, wherein the application is a payment application and the another application is an authentication application.

15. The apparatus of claim 1, wherein the secure element is further configured to store an indication regarding at least one of whether the application is activated or whether the application supports a software flag.

16. The apparatus of claim 15, wherein the software flag indicates whether the application is authenticated.

17. The apparatus of claim 1, wherein the secure element is further configured to receive activation of the application.

18. The apparatus of claim 1, wherein executing the application is based at least in part on at least one of whether the application is activated, whether a software flag of the application indicates that the application is authenticated, or whether the apparatus is proximate to the electronic device.

19. The method of claim 7, wherein executing the application is based at least in part on at least one of whether the application is activated, whether a software flag of the application indicates that the application is authenticated, or whether the apparatus is proximate to the electronic device.

20. The apparatus of claim 8, wherein the secure element is further configured to store an indication regarding at least one of whether the application is activated or whether the application supports a software flag.

* * * * *